Sept. 13, 1955 H. A. SHABAKER 2,717,458
APPARATUS FOR TREATING GRANULAR MATERIAL
Filed Dec. 23, 1952
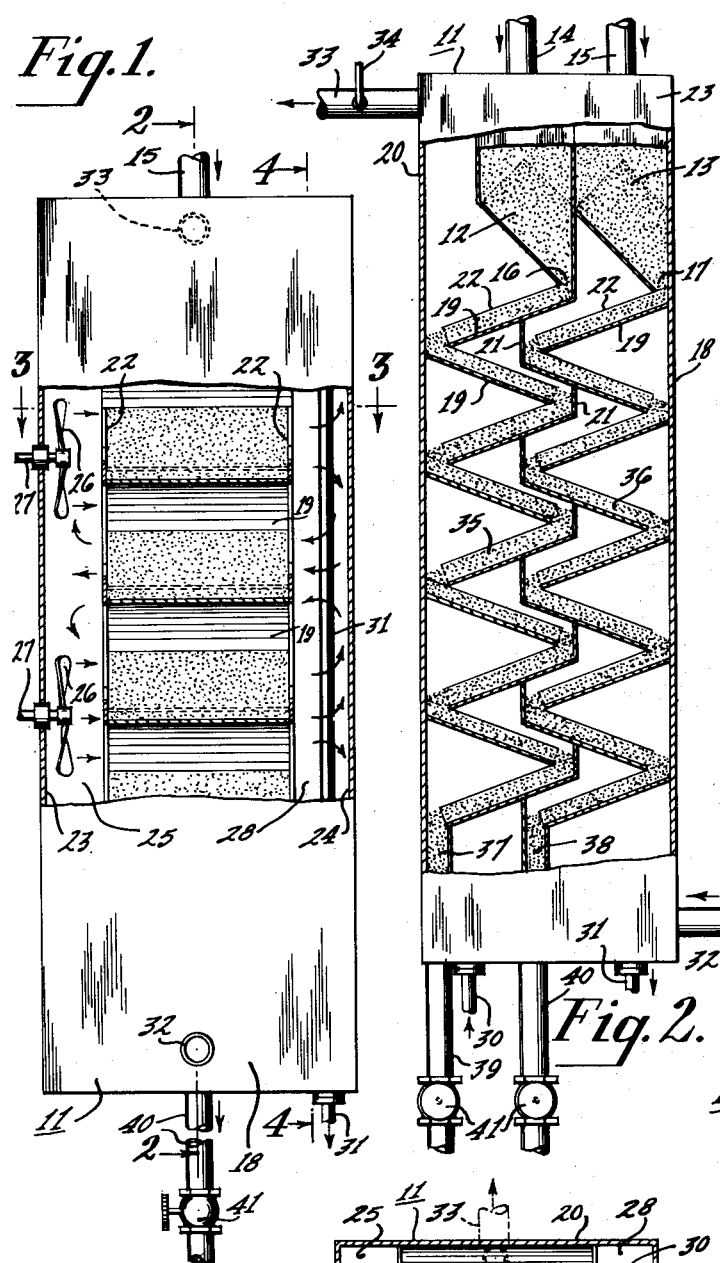
Fig.1.
Fig.2.
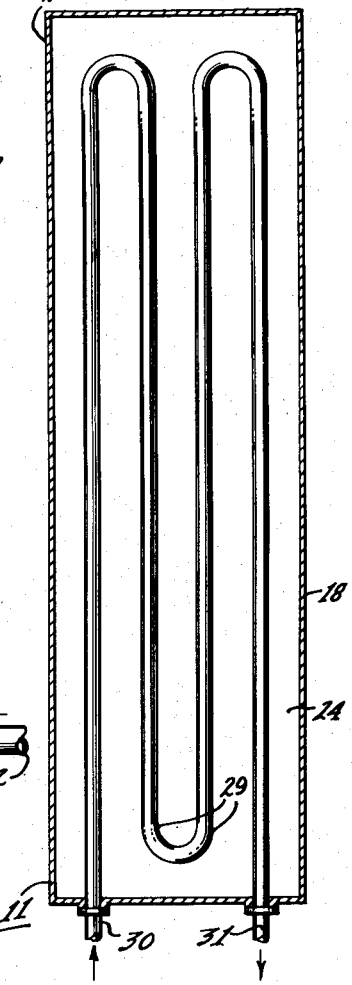
Fig.4.
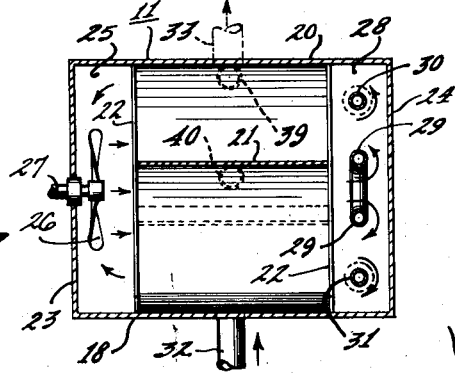
Fig.3.
INVENTOR
Hubert A. Shabaker
BY
William Klabunde
ATTORNEY

# United States Patent Office 2,717,458
Patented Sept. 13, 1955

2,717,458

APPARATUS FOR TREATING GRANULAR MATERIAL

Hubert A. Shabaker, Media, Pa., assignor to Houdry Process Corporation, Wilmington, Del., a corporation of Delaware Application December 23, 1952, Serial No. 327,550

5 Claims. (Cl. 34—167)

This invention relates to an apparatus for treating granular material by contact with gaseous material, and particularly to a treatment wherein granular material while passing through a treating zone is contacted by a stream of gaseous material which passes over, around, and through the moving mass of granular material.

A particularly advantageous application of the invention is in the drying of granular contact material, such as the catalyst beads or pellets described in U. S. Patent No. 2,384,946, issued to M. M. Marisic on September 18, 1945. In the drying of catalyst beads and other types of granular material, it has heretofore been a practice to convey the solid particles on suitable moving surfaces, such as trays or belts, and to transfer the particles to successively lower levels as the material is passed continuously through a confined heating zone or chamber. While passing through the heating chamber the particles are subjected to a cross-flow of hot gaseous material, such as air or other inert gas, which is forceably circulated around the moving stream of material by suitable fans or blowers. The gaseous material may be introduced and removed at the ends or at intermediate locations along the heating chamber. The gas may be heated externally of the chamber or heated within the chamber by heating means disposed in the path of the gaseous stream.

In multi-level heating apparatus wherein the granular material is transported horizontally as a static mass or layer a substantial distance at each level, mechanical means is usually employed to engage the material at the end of each horizontal run and to direct or convey it, generally by force of gravity, to the next lower level. A disadvantage of such method is that the granular material during its horizontal run is not uniformly exposed to the current of gaseous treating material, with respect to either the individual particles or individual surface areas of the same particle. It is therefore desirable that each particle and each surface area of a particle be given an equal opportunity for contact with the treating medium such as drying air.

In accordance with the invention, the granular material flows downwardly as a continuous compact moving stream along at least one zig zag path through a vertically elongated drying zone. During its lateral movement through the drying zone the stream of material flows as a shallow layer having an exposed upper surface. Drying gas is introduced into, and moisture-containing gas is removed from, the drying zone each at one or more suitable locations. The drying gas may be heated prior to its introduction into the drying zone, or suitable heating means, such as a pipe coil, may be located within the drying zone in such position as to intercept the gaseous material in its path of movement through the drying zone. In passing through the drying zone the gaseous material is made to flow laterally back and forth across the drying zone in contact, during its lateral movement, with the exposed surfaces of the descending stream or streams of granular material. The stream of granular material is supported during its descent upon shallow trays or chutes which slope alternately in opposite directions, and are arranged to pass the granular material as a continuous compact stream from tray to tray downwardly through the drying zone. The trays or chutes are each sloped at an angle not substantially greater than that which will assure continuous movement of the granular material, taking into consideration than the degree of adhesion between the sliding mass and the supporting surfaces may vary as a result of changes in the physical structure or nature of the granular material during the drying treatment. It is contemplated that a tray angle which is at or slightly below the angle of repose for the particular material will, in general, be most advantageous. Continuous flow may be further assured, especially in connection with the drying of particles of irregular shape, by suitable known devices for vibrating the trays.

In one embodiment of the invention, a vertically elongated drying chamber of rectangular cross section is provided along one side wall with a series of vertically spaced blowers and along the other side wall with a heating coil. The region between the blowers and the coil is occupied by a series of sloping tray elements arranged in nested relationship to form with each other and with the remaining side walls a plurality of zigzag paths for conducting granular material downwardly through the chamber. The zigzag paths are so formed that the material-supporting surface of one sloping tray member is relatively closely spaced from and is parallel to the sloping undersurface of the above adjacent tray, the spacing therebetween being sufficiently in excess of the thickness of the layer of beads sliding downwardly through the space to provide an unobstructed passageway laterally across the heating chamber between the surface of the sliding layer of material and the undersurface of the tray above for the continuous passage of the stream of drying gas. By reason of the fact that the layer of material discharging from the lower end of one sloping surface is deposited upon the upper end of a surface sloping in the opposite direction, the upper and lower portions of each layer tend to reverse their positions and become thoroughly mixed in passing from one sloping surface to the next. Particle segregation is thereby substantially avoided, and the particles, in being turned over while passing from one layer to the next, expose new surfaces of the particles to the current of drying gas passing over the moving layers.

For a further understanding of the invention reference may be had to the accompanying drawing forming a part of this application, in which:

Fig. 1 is an elevational view of the heating apparatus with a portion thereof broken away to more clearly reveal the deposition of the passageway for the granular material, the heating elements and the air circulating means, the representation being to a considerable degree diagrammatic, especially with respect to the means for circulating the gas over the downwardly moving layers of granular material;

Fig. 2 is a side view of Fig. 1 taken in partial section along the line 2—2 shown in Fig. 1;

Fig. 3 is a sectional plan view taken along the line 3—3 of Fig. 1.

Fig. 4 is a section taken along line 4—4 of Fig. 1.

Referring to the drawings, a heating apparatus or dryer for granular material, such as catalyst beads, is provided, comprising an elongated vertical housing 11 of rectangular cross section. The interior of the housing is provided with a plurality of sloping tray or chute members which are arranged to form two parallel zigzag paths for the granular material which extend lengthwise of the housing.

In the upper region of the housing 11 adjacent hoppers 12 and 13 are provided. Granular material is introduced into the upper end of hoppers 12 and 13 through conduits 14 and 15, respectively, the granular material being fed into the housing by gravity flow from a source of supply, not shown, located above the housing. Hopper 12 has a narrow elongated outlet 16 at the bottom thereof which is located substantially at the longitudinal axis of the housing 11, and hopper 13 has a similar outlet 17 located at substantially the same level, but contiguous to the side wall 18 of the housing, the wall 18 also forming one side of hopper 13.

Extending downwardly in a vertical tier below each hopper 12 and 13 are a plurality of sloping trays or chutes 19 arranged in a zigzag pattern which extends downwardly to the lower region of the housing 11. The sloping trays 19 are disposed at such an angle to the horizontal that granular material deposited thereon will flow as a continuous compact stream over the surface of each tray and from tray to tray downwardly through the housing. The trays may be sloped at the same angle to the horizontal, or they may be of progressively different slope to allow for changing characteristics of the granular material as it gravitates through the dryer. Preferably, such angle should be equal to or slightly less than the angle of repose, although it is contemplated that in particular cases it may be necessary or desirable to slope the trays at a greater or lesser angle.

Starting with the uppermost tray 19 is in the tier located below side hopper 13, alternate sloping trays are attached along their uppermost edges to the side wall 18 of the housing 11. These side trays extend downwardly and inwardly toward the center of the housing and terminate in a vertical line adjacent to the longitudinal axis of the housing. Starting with the next to the uppermost tray 19 in the tier located below central hopper 12, alternate sloping trays are attached along their upper edges to the opposite wall 20 of the housing. They also extend downwardly and inwardly toward the center of the housing and terminate in a vertical line adjacent to the longitudinal axis of the housing. The remaining alternate trays 19 of each tier are supported at an intermediate location between the side walls 18 and 20, their uppermost ends being so arranged that granular material falling from the lowermost edge of the tray immediately above will be deposited thereon and conveyed downwardly in a horizontal direction opposite to its direction of movement on the tray above. Each of the intermediate trays is provided along its uppermost edge with an upward extension 21 extending the full width of the tray. Extensions 21 are secured along their upper edges to the undersurface of the intermediate tray next above, as shown in Fig. 2, thereby joining all the intermediate trays into a unitary structure extending lengthwise through the housing. Vertical extensions 21 serve also to confine the stream of granular material discharging from the lower end of a side tray and reverse its direction of flow on the intermediate receiving tray.

Each of sloping trays 19 is provided with upturned sides 22, so as to laterally confine the streams of granular material. The outermost trays are attached along their upper edges to the walls 18 and 20, and the inner trays are joined, as shown in Fig. 2, to form a unitary structure extending the full length of the drying zone.

A space 25 is provided between the tray structure and wall 23 for the placement of a series of vertically-spaced fans 26 whose shafts 27 extend through the wall 23 and are connected to individual motors or other driving means, not shown. A space 28 between the tray structure and the opposite wall 24 contains a heating coil 29. An inlet conduit 30 and an outlet conduit 31 provide continuous circulation of a fluid heat-exchange medium for indirect heat exchange with the gaseous material circulating within the dryer. The tubes of the coil may be of any known type designed for high heat-transfer rates.

The fans 26 cause a continuous circulation of the drying gas, such as air, over and under the trays 19. The gas flows horizontally across the surface of the moving layer of granular material on each of the trays, the direction of gas flow preferably being such as to establish at vertically-spaced locations throughout the length of the housing a back-and-forth lateral movement of the gas stream as it passes through the housing.

Drying air may be introduced into housing 11 through an inlet conduit 32 provided in the lower end of side wall 18. After passing upwardly through the housing, while being circulated horizontally at each tray level, the moisture-filled air may be discharged from the housing through outlet conduit 33, provided with a flow control device 34.

At the bottom of housing 18, the zigzag streams 35 and 36 discharge directly onto compact moving beds or columns 37 and 38, respectively, at the bottom of which the granular material is withdrawn respectively through elongated conduits 39 and 40. Valves 41 are provided near the lower ends of draw-off conduits 39 and 40 to control the rate of discharge. The rate of discharge is so controlled that there is no free fall of granular material at any point between the source of supply, that is hoppers 12 and 13, and the points of flow control, that is valves 41. In other words, the granular material flows as a compact moving mass through the housing 18 and the draw-off conduits 39 and 40. For purposes explained in my copending application, Serial No. 327,549, filed concurrently herewith, conduits 39 and 40 and/or the structural members laterally confining the compact moving beds or columns 37 and 38 may be adapted to provide a variable storage capacity, so that the material may be held under controlled conditions for a desired controllable residence time after leaving the tray structure and before discharge from the conduits 39 and 40.

The method and apparatus of the present invention are of particular advantage in the manufacture of bead catalyst for hydrocarbon conversion systems, and especially in the treatment of the catalyst beads during the preliminary or constant rate drying period.

By reason of the cross-flow drying over the surfaces of shallow beds of beads, rather than through the beds, a substantial uniformity of moisture content from bead to bead is readily obtained, even with substantial variation in bead size. The present arrangement provides numerous bead mixing zones, that is in the regions where the beads are transferred from tray to tray, and such mixing is accomplished without requiring mechanical mixing devices or free fall of the beads, both of which are known to result in undesirable breakage of the beads.

Because of the cross-flow drying, and the fact that the relatively low pressure drop through the system permits the circulation of large quantities of drying gas with minimum power consumption, the drying unit is highly efficient.

In controlling the rate of throughput by the controlled removal of beads from the draw-off conduits at the bottom of the dryer, definite processing advantages are obtained, inasmuch as the beads can be held for a desired residence time at the temperature at which they leave the actual drying zone, without need for subsequent re-heating and without danger of steam condensation on the beads. This is of extreme importance in the "aging" operation which is a known part of bead catalyst manufacture.

Furthermore, the drying unit is compact and sturdy, and has a relatively small external wall area, which makes it especially adaptable for a super-heated steam drying operation, especially where steam condensation cannot be tolerated.

Obviously many modifications and variations of the invention as hereinbefore set forth may be made without departing from the spirit and scope thereof, and therefore only such limitations should be imposed as are indicated in the appended claims.

What is claimed is:

1. Apparatus for treating granular material with a gaseous material comprising a vertically elongated housing, a plurality of hoppers within the upper end of said housing having narrow elongated discharge outlets at their lower ends, means for introducing said granular material into the upper ends of said hoppers, a series of inclined trays arranged in a vertical tier below each of said hoppers, and alternately inclined in opposite directions so as to form a continuous zigzag path for passing said granular material downwardly through said housing, the uppermost said trays being adapted to receive said granular material from said hoppers as a wide laterally-confined moving layer and to convey said moving layer downwardly by gravity flow, the lower end of each of said trays being adapted to discharge said granular material as a downwardly moving column onto the upper end of the tray next below, the side walls of said housing forming one of the vertical confining surfaces for discharged granular material descending upon those trays whose upper ends are adjacent to said housing walls, and the uppermost edges of trays whose upper ends are spaced inwardly from said housing walls being upturned to form vertical confining surfaces for the material descending thereon from the trays above, means at the discharge ends of the lowermost of said trays for removing said granular material from said housing, means for introducing streams of gaseous material at vertically spaced points along a side thereof, means extending lengthwise of said housing for circulating a confined fluid heat exchange medium, said gaseous material being circulated in paths extending alternately back and forth across said housing between said trays and including said means for circulating a confined fluid heat exchange medium, and means for withdrawing gaseous material from said housing.

2. Apparatus for treating granular material with a gaseous material comprising: a vertically elongated housing of rectangular horizontal cross section; means for introducing granular material into the upper end of said housing; a plurality of inclined trays at each of a plurality of horizontal levels within said housing, said trays having upwardly extending sides and being arranged with their ends overhanging, the trays at alternate levels being oppositely inclined and each tray below the uppermost level being arranged to receive at its upper end material discharging from the lower end of the oppositely sloped tray immediately above, thereby forming a laterally-nested plurality of zig-zag paths for conveying said material downwardly through said housing, the outermost trays which slope downwardly toward the vertical axis of said housing having their upper ends contiguous to the opposite side walls of said housing, and each of the remaining trays having its upper end contiguous to and spaced from the lower end of the tray in the adjacent tier at the level next above; means for continuously distributing introduced granular material into each of said paths; means for withdrawing granular material at the lower end of each path at a controlled rate adapted to maintain compact gravitational flow of said granular material through each of said paths; means for introducing said gaseous material at the lower end of said housing; means for effecting a flow of said gaseous material laterally across the surface of the moving layer of granular material on each of said trays; and a gas outlet at the upper end of said housing.

3. Apparatus as defined in claim 2 in which said means for effecting a flow of gaseous material laterally across the surfaces of granular material on said trays comprises a plurality of forced convection means within said housing vertically spaced along one side of the assemblage of trays, each of such convection means being adapted to flow said gaseous material horizontally across at least one level of trays to the opposite side of said housing, said gaseous material, while following a generally upward course of flow through said housing toward said gas outlet being returned for periodic recirculation by flowing in a reverse direction across at least one level of trays located between said first-mentioned levels of horizontal gas flow.

4. Apparatus as defined in claim 3 including means located at said opposite side of said housing for supplying heat to said circulating gaseous material.

5. Apparatus as defined in claim 4 in which said means for supplying heat to said circulating gaseous material comprises a coil for continuously passing a fluid heat exchange medium in indirect heat exchange with said gaseous material.

References Cited in the file of this patent

UNITED STATES PATENTS

| | | |
|---|---|---|
| 1,871,863 | Stansfield | Aug. 16, 1932 |
| 2,048,112 | Gahl | July 21, 1936 |
| 2,610,412 | Rasmussen | Sept. 16, 1952 |

FOREIGN PATENTS

| | | |
|---|---|---|
| 42,716 | France | Sept. 14, 1933 |
| | (1st addition to 648,100) | |